July 8, 1930.  V. LANCIA  1,770,314
DRIVING GEAR FOR VEHICLES
Filed Aug. 16, 1928
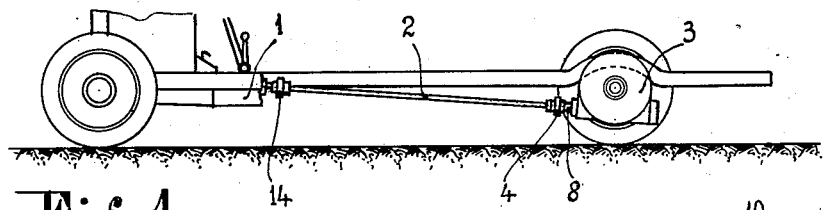
Fig.1
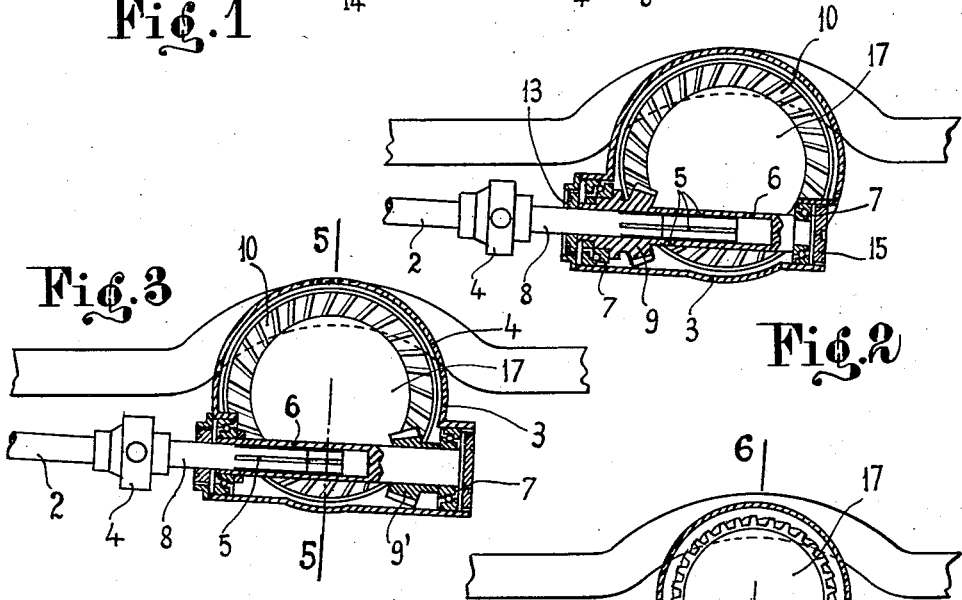
Fig.2
Fig.3
Fig.4
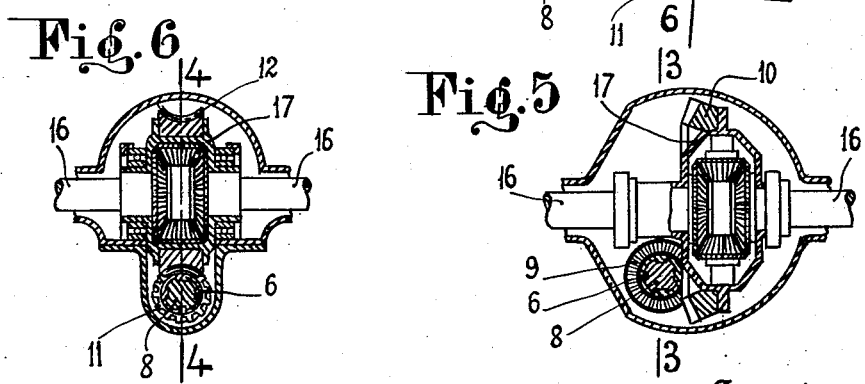
Fig.5
Fig.6
Inventor.
Vincenzo Lancia
by
Langner Parry Card & Langner
Att'ys Patented July 8, 1930

1,770,314

UNITED STATES PATENT OFFICE

VINCENZO LANCIA, OF TURIN, ITALY

DRIVING GEAR FOR VEHICLES

Application filed August 16, 1928, Serial No. 300,082, and in Italy July 4, 1928.

This invention relates to driving mechanism of automotive vehicles and has for its object a driving or transmission device in which the sliding coupling intended to provide for changes in distance between the wheel axle and the engine or speed box (said changes depending upon the vertical displacements of said wheel axle with respect to the vehicle frame and engine or/and speed box) is located in said wheel axle and within the casing which encloses the wheel axle gear.

The arrangement of the present invention secures best conditions in mounting the transmission mechanism and a very efficient lubrication of said sliding coupling.

On the annexed drawing is shown by way of example an embodiment of the present invention and:

Figure 1 is a general side view of the frame of an automotive vehicle having a transmission mechanism according to the present invention;

Figure 2 is a fragmentary section with parts removed of a rear axle arranged in accordance with this invention for the drive of a differential gear by means of a bevel pinion whose axis is located below the axis of the differential rim;

Figure 3 is a fragmentary sectional view of a modified construction with said driving pinion at the rear of said differential rim, on lines 3—3 of Fig. 5;

Figure 4 is a fragmentary sectional view of a construction with a worm gear drive, on line 4—4 of Fig. 6;

Figure 5 is a fragmentary section on line 5—5 of Fig. 3 and

Figure 6 is a fragmentary section on line 6—6 of Fig. 4.

It is known that in transmissions of automotive vehicles, to provide for large variations of distance between the rear axle and the engine or speed box, the driving shaft intended to transmit the drive from the engine to the rear axle or differential gear, is connected either with the engine or speed box shaft, or with a shaft extending outside of the rear axle casing, by means of a splined or sliding joint which secures the transmission of the drive while providing for longitudinal respective displacements said splined joint being either adjacent to the engine or speed box, or adjacent to the rear axle and outside of the casing of the rear axle.

In the construction of this invention on the contrary said splined or sliding coupling is located within the casing of the rear axle.

The general arrangement is shown in Figure 1 where 1 is the engine or speed box casing, 2 is the driving shaft and 3 shows the rear axle casing. For the purposes of the present invention said shaft 2 is connected by means of a flexible coupling 4 with a shaft 8 extending within the casing 3 of the rear axle.

Said shaft 8 has splines 5 in its portion within said casing 3 and it enters a cooperating splined sleeve 6 journalled by ball bearings 7—7 in the casing 3, suitable seats, collar 13 and plug 15 being provided for mounting said sleeve 6 in casing 3.

Said cooperating splined shaft 8 and sleeve 6 provide a sliding coupling which permits of the displacements in the vertical direction of the rear axle, and consequent oscillations of the driving shaft 2 around the centre of the front flexible coupling 14, said respective movements producing a longitudinal respective movement of sleeve 6 with respect to shaft 8; of course the respective length of the splined portions of the members and the extent to which shaft 8 enters sleeve 6 must be such as to provide for said longitudinal respective displacements.

Sleeve 6 carries a member imparting the drive to the differential gear enclosed in the rear axle casing, said differential gear being of any conventional design as shown diagrammatically by 17 (Figs. 5 and 6) and driving the vehicle-wheel driving axles 16—16; said differential gear comprises of course a toothed rim 10 driven by the sleeve 6 and a member solid therewith and meshing with said rim.

In the construction of Figure 2 a spiral toothed bevel pinion 9 is solid with sleeve 6 and it meshes with toothed rim 10 of the differential gear in its front portion with respect to the axis of said differential gear;

in view of the use of a spiral bevel pinion and rim, said pinion 9 with its sleeve 6 and shaft 8 are located below the differential gear axis.

In the construction of Figures 3 and 5 a driving pinion 9' is used which is similar to the above described one.

However in this construction the pinion 9' is located at the rear of the axis of the differential gear with the advantage that the front portion of the rear axle casing may be depressed towards the rear and therefore the flexible coupling 4 which connects driving shaft 2 with shaft 8 may be arranged closer to the supporting means for shaft 8 in casing 3; further the said flexible coupling 4, being at a point at the rear of the position it has in the construction of Figure 2 along the downwardly inclined shaft 2, may be at a lower level, this being an advantage in that the floor of the vehicle body may be lowered with respect to other constructions.

In the construction of Figures 4 and 6 the sleeve 6 carries a worm 11 engaging a worm rim 12 solid with the planet carrier of the differential gear.

Of course any desired means may be used for imparting the drive to the differential gear, the present invention being only confined by appended claims.

The arrangement of this invention provides for a satisfactory mounting of the member driving the differential gear said member, as 9, 9' or 11, being located on a sleeve which is efficiently supported at both ends in the rear axle casing.

Further the splined or sliding joint interconnecting shaft 8 with sleeve 6 is located in the oil bath existing in the rear axle casing and said joint is permanently and efficiently lubricated without special provisions being required.

What I claim as my invention and desire to secure by United States Letters Patent is:—

1. In automotive vehicles, a driving transmission mechanism comprising a driving axle, a driving gear for said axle, a casing enclosing said gear, a splined sleeve mounted to rotate in said casing with its axis under the axis of said gear, means on said sleeve for driving said gear, a driving shaft having a splined portion entering said splined sleeve for imparting drive thereto while being free therefrom in longitudinal direction and a floating coupling connecting said driving shaft with a shaft driven by the vehicle engine.

2. In automotive vehicles, a driving transmission mechanism comprising a driving axle, a driving gear for said axle, a toothed member on said gear, a casing enclosing said gear, a splined sleeve mounted to rotate in said casing with its axis under the axis of said gear and toothed member, a second toothed member on said sleeve meshing with said gear toothed member and driving it, in its lower half portion a driving shaft having a splined portion entering said splined sleeve for imparting drive thereto while being free therefrom in longitudinal direction and a floating coupling connecting said driving shaft with a shaft driven by the vehicle engine.

3. In automotive vehicles, a driving transmission mechanism comprising a driving axle, a driving gear for said axle, a toothed rim on said gear, a casing enclosing said gear, a splined sleeve mounted to rotate in said casing with its axis under the axis of said gear, a pinion on said sleeve meshing with said toothed rim in its lower and rear portion, a driving shaft having a splined portion entering said splined sleeve for imparting drive thereto while being free therefrom in longitudinal direction and a floating coupling connecting said driving shaft with a shaft driven by the vehicle engine.

In testimony whereof I have signed my name to this specification.

VINCENZO LANCIA.